No. 689,900. Patented Dec. 31, 1901.
J. McCORMICK.
MACHINE FOR SHOCKING GRAIN IN THE FIELD.
(Application filed Oct. 5, 1900.)
(No Model.) 8 Sheets—Sheet 1.

Witnesses:
F. G. Stuart,
R. G. Orwig.

Inventor: John McCormick,
By Thomas C. Orwig, Attorney.

No. 689,900. Patented Dec. 31, 1901.
J. McCORMICK.
MACHINE FOR SHOCKING GRAIN IN THE FIELD.
(Application filed Oct. 5, 1900.)
(No Model.) 8 Sheets—Sheet 3.
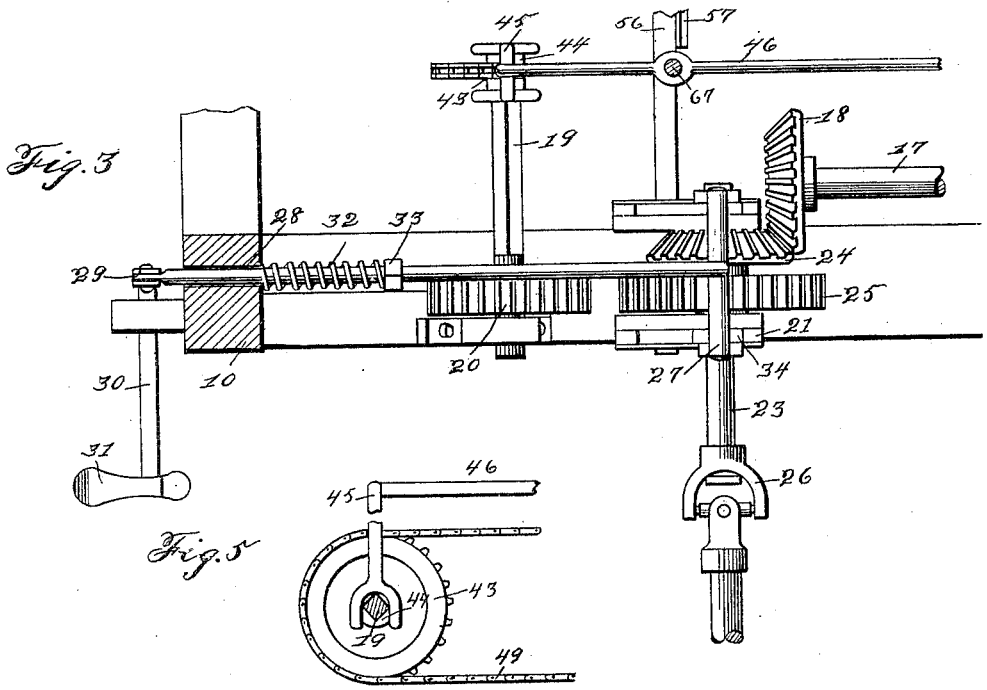
Fig. 3
Fig. 5
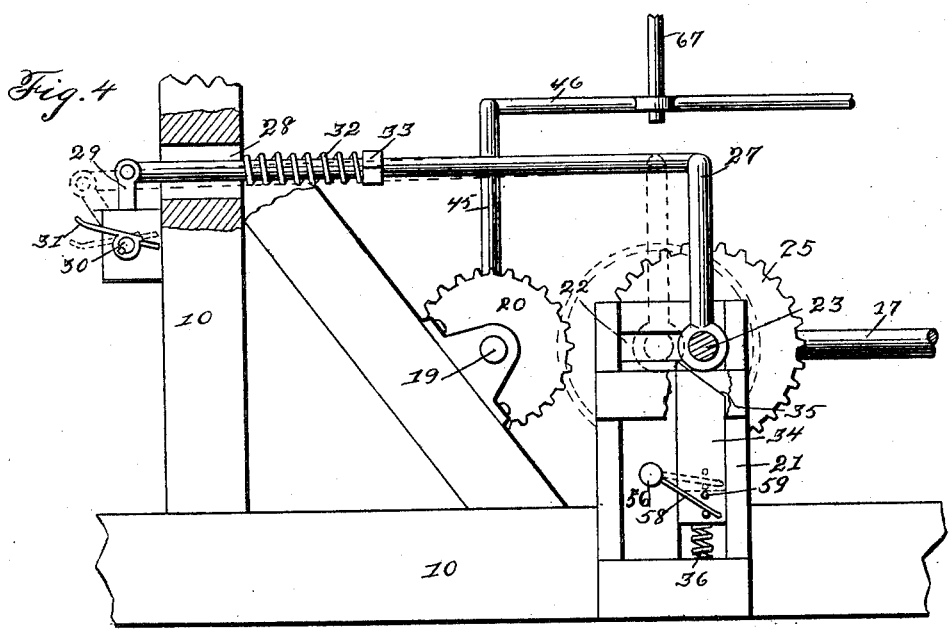
Fig. 4
Witnesses: F. C. Stuart, R. G. Orwig.
Inventor John McCormick
By Thomas C. Orwig, Atty.

No. 689,900. Patented Dec. 31, 1901.
J. McCORMICK.
MACHINE FOR SHOCKING GRAIN IN THE FIELD.
(Application filed Oct. 5, 1900.)
(No Model.) 8 Sheets—Sheet 4.

No. 689,900. Patented Dec. 31, 1901.
J. McCORMICK.
MACHINE FOR SHOCKING GRAIN IN THE FIELD.
(Application filed Oct. 5, 1900.)
(No Model.) 8 Sheets—Sheet 5.
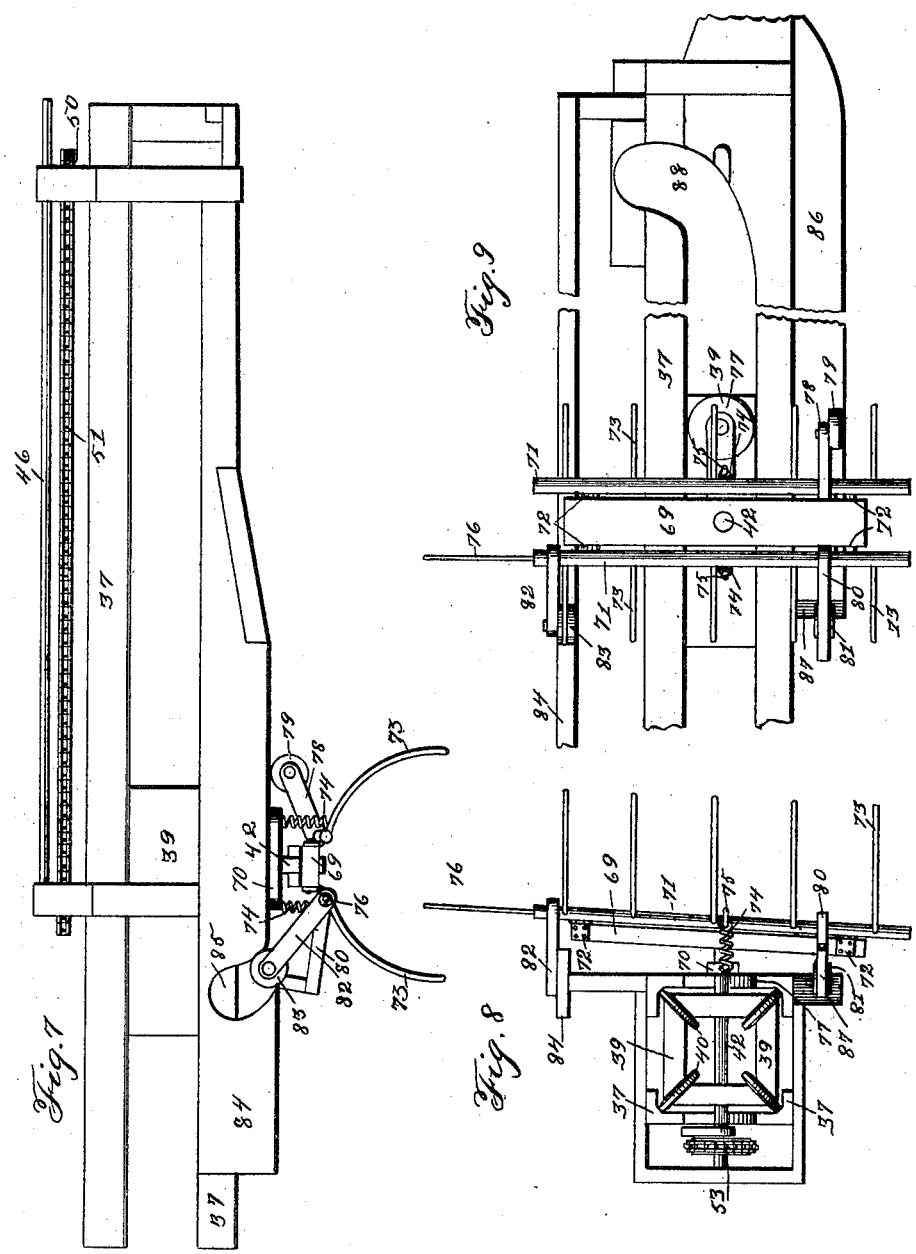

No. 689,900. Patented Dec. 31, 1901.
J. McCORMICK.
MACHINE FOR SHOCKING GRAIN IN THE FIELD.
(Application filed Oct. 5, 1900.)
(No Model.) 8 Sheets—Sheet 6.
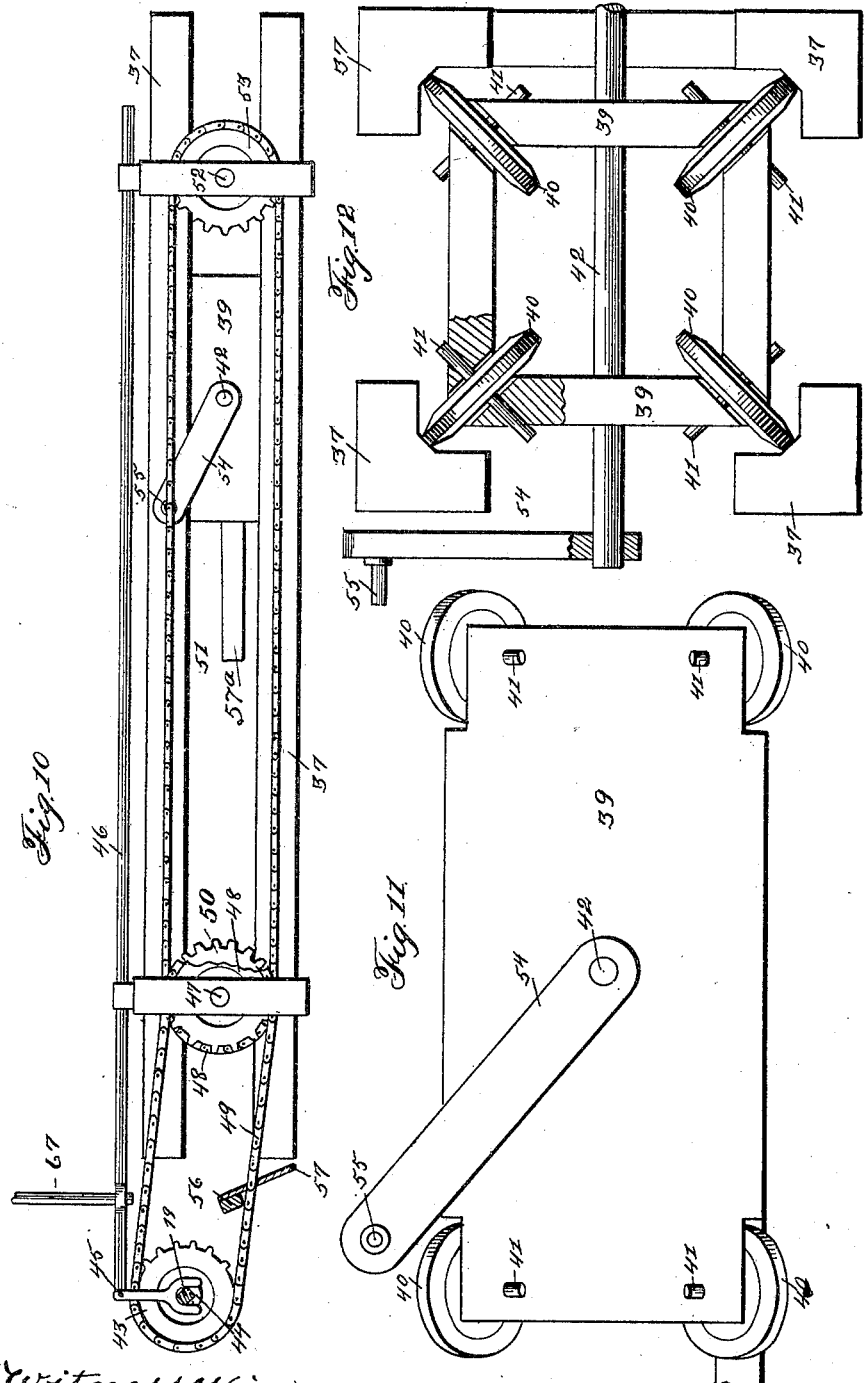

No. 689,900. Patented Dec. 31, 1901.
J. McCORMICK.
MACHINE FOR SHOCKING GRAIN IN THE FIELD.
(Application filed Oct. 5, 1900.)
(No Model.) 8 Sheets—Sheet 7.

Witnesses: F. C. Stuart, R. S. Orwig.

Inventor John McCormick
By Thomas O. Orwig, Attorney.

No. 689,900. Patented Dec. 31, 1901.
J. McCORMICK.
MACHINE FOR SHOCKING GRAIN IN THE FIELD.
(Application filed Oct. 5, 1900.)
(No Model.) 8 Sheets—Sheet 8.
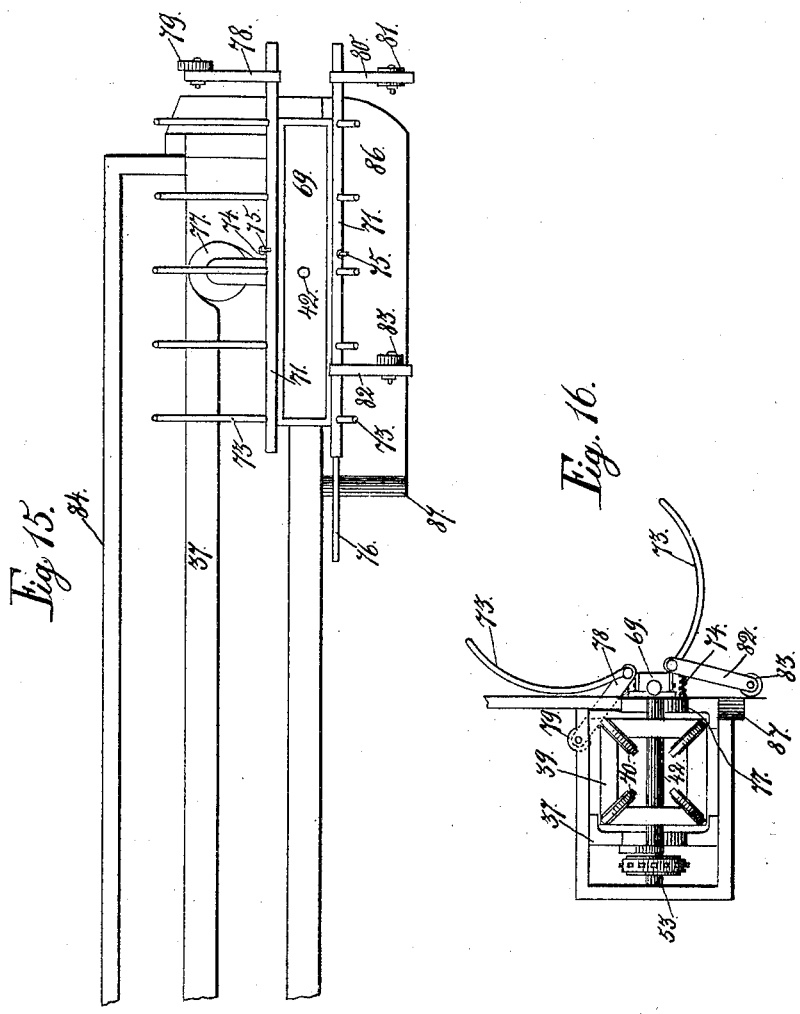

UNITED STATES PATENT OFFICE.

JOHN McCORMICK, OF SPEARFISH, SOUTH DAKOTA.

MACHINE FOR SHOCKING GRAIN IN THE FIELD.

SPECIFICATION forming part of Letters Patent No. 689,900, dated December 31, 1901.

Application filed October 5, 1900. Serial No. 32,097. (No model.)

*To all whom it may concern:*

Be it known that I, JOHN MCCORMICK, a citizen of the United States, residing at Spearfish, in the county of Lawrence and State of South Dakota, have invented certain new and useful Improvements in Grain-Shockers, of which the following is a specification.

The object of this invention is broadly to provide a machine of simple, durable, and inexpensive construction designed to be connected with and to operate in a field by the side of any ordinary binder to receive the bundles of grain from the binder, convey them to a shock-former, and to tightly press them into a shock of such size as the operator may determine and when thus formed into a shock and tightly compressed to stand the shock in an upright position upon the ground-surface, all of which operations may be accomplished without stopping the machine, and the operator of the binder may perform all operations necessary for the shocker attachment.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1:
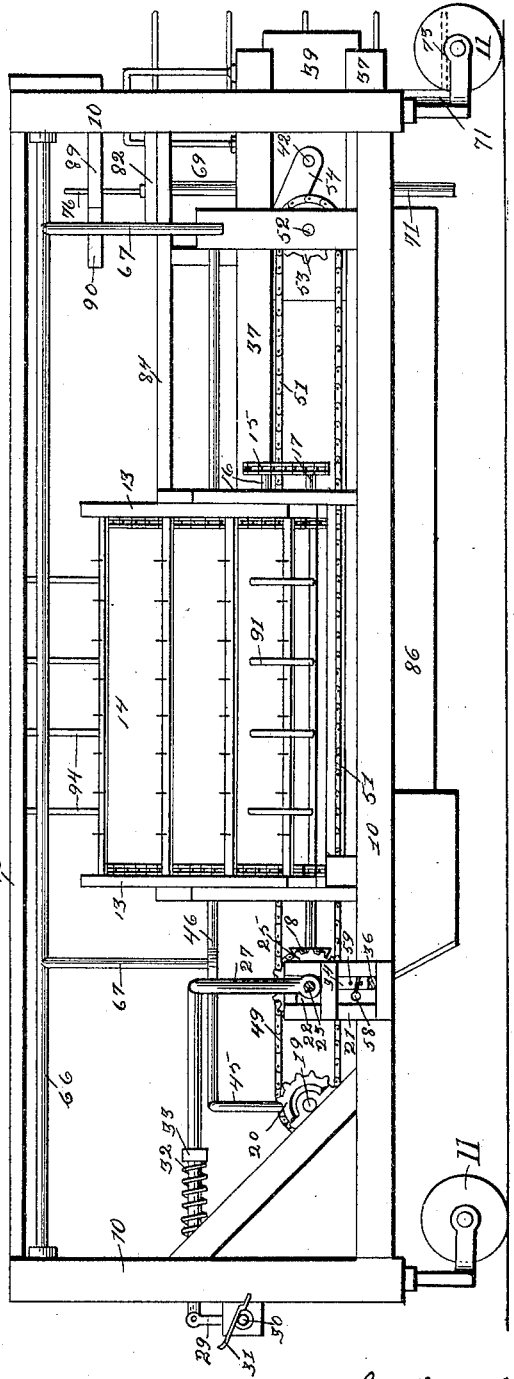
Figure 2:
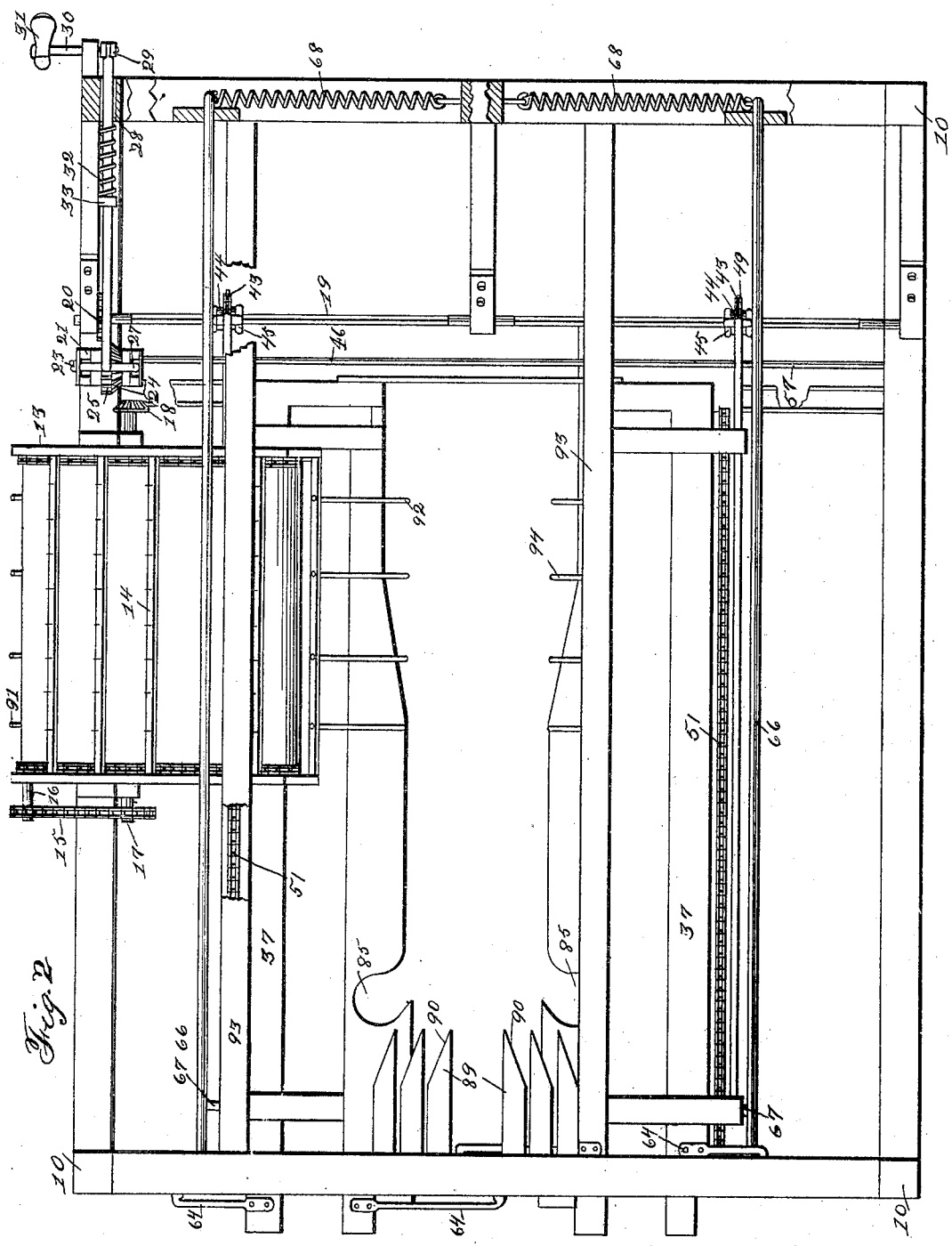
Figure 6:
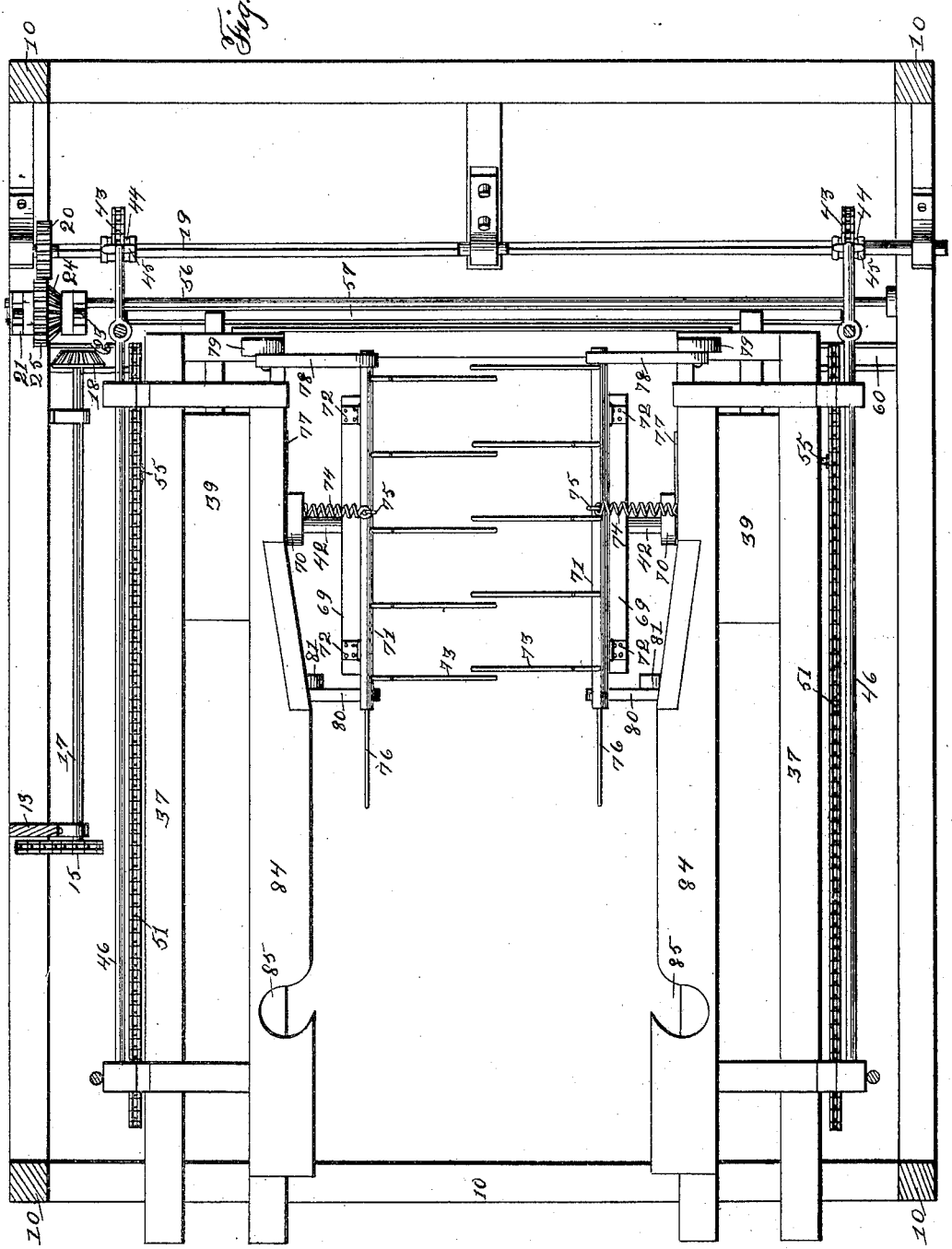
Figure 13:
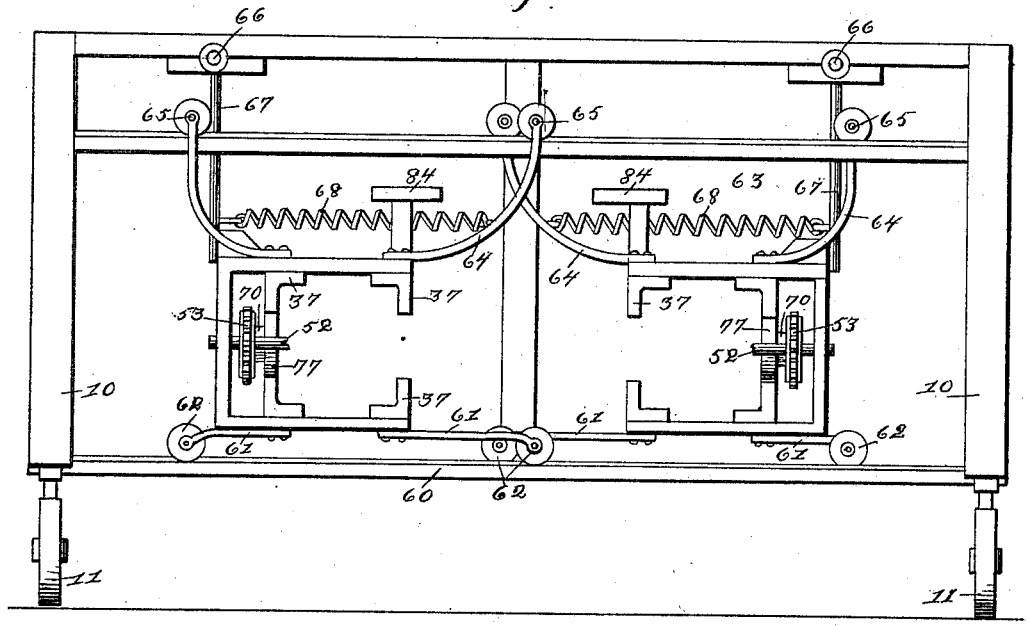
Figure 14:
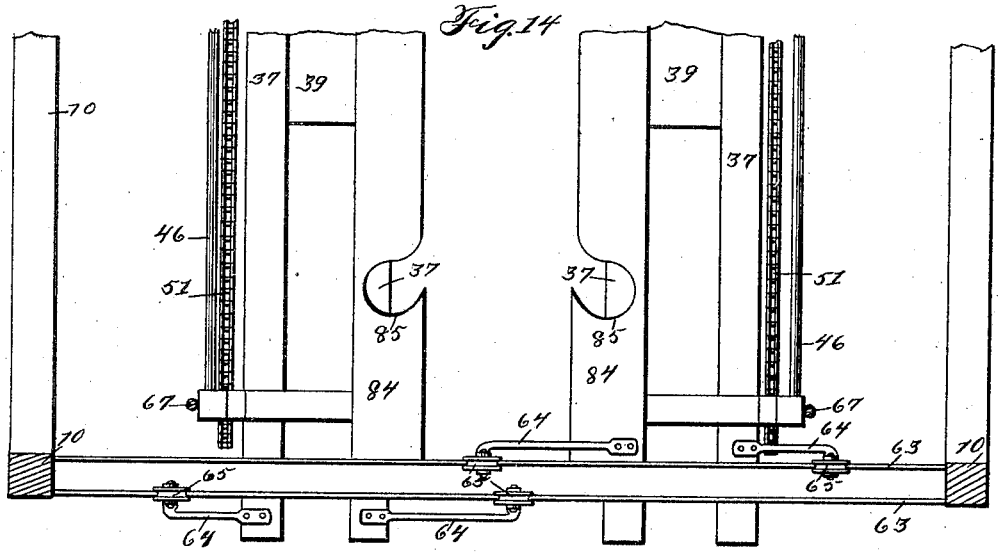

Figure 1 shows a side elevation of the complete machine, taken from the side designed to stand adjacent to the binder. Fig. 2 shows a top or plan view of the complete machine. Fig. 3 shows an enlarged detail sectional view illustrating the means whereby the operating-shaft of the shocker is connected for operation with the binder and illustrating, further, the means whereby the driver or operator of the binder may actuate the shocker mechanism to discharge a shock of grain. Fig. 4 shows an enlarged detail view of the same mechanism, taken from the side, with a portion of the mechanism shown in dotted lines to illustrate the position required for operating the shock-discharging mechanism and also the position required for operating the conveyer leading to the shock-former. Fig. 5 is an enlarged detail view illustrating the means for sliding the sprocket-wheels which operate to carry the shock-former forwardly and rearwardly along the squared shaft of the sprocket-wheel. Fig. 6 shows a sectional plan view of the entire machine, taken from a point above the shock-receiving forks and showing said forks in position to receive bundles of grain. Fig. 7 shows a detail plan view illustrating one of the carriage-frames and accompanying parts, with one of the shock forming and holding forks connected with the carriage and shown in its vertical position. Fig. 8 shows an end elevation of the same mechanism. Fig. 9 shows a side elevation of the forward end portion of the carriage-track with the carriage in position therein and one of the shock-holding forks connected with said carriage and shown in the vertical position. Fig. 10 shows a detail side elevation of one of the carriage-tracks with the carriage in position therein to illustrate the mechanism for operating said carriage in the track and also illustrating the position of the trip device with relation to the carriage and carriage-track. Fig. 11 shows an enlarged detail elevation of one of the carriages. Fig. 12 shows an end elevation of same with portions of the carriage-track adjacent thereto. Fig. 13 shows a rear elevation of the machine-frame with the carriage-tracks in position therein for the purpose of illustrating the means for supporting the rear end portions of the carriage-tracks, whereby they may move laterally in a direction to and from each other. Fig. 14 shows a top or plan view of a portion of the rear end of the machine-frame with the rear end portions of the carriage-tracks in position to illustrate the means for supporting said carriage-tracks. Fig. 15 shows an enlarged detail view illustrating one of the shocker members in its horizontal position as required to receive the grain and also showing various guides for controlling the movements of the shocking member. Fig. 16 is an enlarged detail view illustrating the front end of the shocking member, shown in position for receiving grain and also showing the adjacent surface of the guide upon which the caster for controlling the movements of the shocking member operates.

Referring to the accompanying drawings, I have used the reference-numeral 10 to indicate the machine-frame. This frame is preferably mounted upon the wheels 11 and may be advanced over the field by means of draft-animals attached direct to it, or it may be coupled to the binder by suitable braces to be advanced over the field by the draft-animals attached to the binder.

As clearly shown in Figs. 1 and 2 of the drawings, there is at one side of the machine a trough or chute 13, extending inwardly and upwardly toward the central portion of the machine-frame. In this chute or trough I have mounted an endless conveyer 14 of ordinary construction. This conveyer is driven by means of a sprocket-chain 15, geared to a sprocket-wheel on the end of one of the conveyer-shafts 16 and connected with a sprocket-wheel on the shaft 17, mounted in suitable bearings in the machine-frame. On the opposite end of the shaft 17 is a bevel gear-wheel 18, and this gear-wheel 18 is arranged to be driven intermittently during the operation of the machine—that is, at such times as the shock-placing mechanism is not operated.

The reference-numeral 19 indicates a shaft rotatably mounted in suitable bearings and extended transversely of the machine-frame and preferably squared, except at its bearing-point. Mounted on this shaft 19 is a cog-wheel 20. This shaft 19 is arranged, in a manner hereinafter made clear, to operate the mechanism for setting up the shock in the field, and at this time I desire to make clear the construction and operation of the mechanism whereby the shaft 19 is driven at such times as the shaft 17, which operates the conveyer, is idle, and vice versa. This mechanism is clearly illustrated in Figs. 3, 4, and 5 and is as follows:

The reference-numeral 21 indicates a frame secured to the machine-frame and having in its upper end a horizontal slot 22, through which a shaft 23 is passed, which shaft is capable of horizontal movement within said slot. On the shaft 23 are a beveled gear-wheel 24 and a cog-wheel 25, the said beveled gear 24 being designed to mesh with the beveled gear-wheel 18, and the cog-wheel 25 is designed to mesh with the cog-wheel 20. Hence when at one limit of its movement the shaft 23 is operatively connected with the shaft 17 through the beveled gear-wheels, and when at the other limit of its movement it is connected with the shaft 17 through the cog-wheels. This shaft 23 is provided with a universal joint 26, and it is arranged to be connected with and driven by the binder driving mechanism. Connected with the shaft 23 is an arm 27 to project upwardly and then forwardly through a slot 28 in the machine-frame. Its forward end is connected to a crank-arm 29 on a crank-shaft 30, mounted in suitable bearings on the machine-frame, and a treadle 31 is fixed to the outer end of the shaft 30 in position where it may be operated by the driver of the binding-machine. An extensile coil-spring 32 is mounted upon the arm 27, with one end in engagement with the machine-frame and its other end in engagement with a roller 33 on the arm 27. By this means the said arm is normally held in such position that the bevel gear-wheel 24 is meshed with the bevel gear-wheel 18. However, when the operator desires to stop the motions of the conveyer and at the same time to set in motion the shocking mechanism he operates the treadle 31 and forces the arm 27 to carry the shaft 23 to the forward limit of its movement in the slot 22, whereupon the cog-wheel 25 is made to engage the cog-wheel 20, and hence the shaft 19 is operated.

I have provided means whereby the shaft 23 is automatically locked in a position in which the cog-wheels 25 and 26 are in engagement, as follows: In the frame 21 I have mounted a vertically-sliding block 34, the upper end of which block is beveled at 35, as clearly shown in Fig. 4. This block is positioned directly under the shaft 23 when in its position for driving the bevel gear-wheel 18. Beneath said block 34 is an extensile coil-spring 36 to normally hold the said block 34 to the upper limit of its movement. Means are provided, which will be hereinafter made clear, whereby this block is forced and held downwardly against the pressure of the spring. At the present time, however, I desire to set forth only the fact that when the block 34 is in its elevated position the shaft 23 is locked in the position indicated by the dotted lines in Fig. 4, with the gear-wheel 25 in mesh with the gear-wheel 20, and also the fact that when the block 34 is lowered the spring 32 will force the shaft 23 to its position in which the beveled gear-wheels 24 and 18 are meshed. By the arrangement just described it is obvious that it is physically impossible for both the conveyer and the shocking mechanism to be operated at the same time. One must be idle while the other is working.

Referring particularly to Figs. 6, 7, 8, and 9 of the drawings, I have used the reference-numeral 37 to indicate the carriage-tracks and the supporting-frames therefor. These tracks are preferably arranged in parallel positions to extend longitudinally of the machine. They are made capable, as will be hereinafter set forth, of moving to and from each other. In each of said tracks is a carriage, (indicated by the numeral 39,) and, as clearly illustrated in Figs. 11 and 12, the carriage is provided at each of its corners with a wheel 40. Said wheels all stand in planes converging at the center of the carriage, and they are connected with the carriage by means of the axles 41, and through the central portion of each carriage a shaft 42 is extended to project beyond the track at each end for purposes hereinafter made clear. These carriages are made to move longitudinally within the tracks, as follows: Mounted upon the shaft 19 are the sprocket-wheels 43, which are capable of sliding longitudinally upon the shaft, which, as before stated, is squared at the points where the sprocket-wheels are mounted upon it. On the hubs of said sprocket-wheels are annular grooves 44, and the forks 45 are placed in said annular grooves. These forks 45 are attached to a rod 46, which rod is fixed to a portion of the carriage-frame, so that the said sprockets move longitudinally upon the shaft in conjunction with the carriage-frame. A short shaft 47 is mounted on the outer side of each carriage-frame, and a sprocket-wheel 48 is fixed thereto and connected with the sprocket-wheel 43 by means of the sprocket-chain 49. A second sprocket-wheel 50 is fixed to the same shaft, and a sprocket-chain 51 is passed around it. At the other end of the carrier-frame is a shaft 52, and a sprocket-wheel 53 is fixed thereto, with the sprocket-chain 51 passing around it. Mounted upon the shaft 42 is an arm 54, having a laterally-projecting pin 55 at one end, which pin is fixed to the chain 51. Obviously when the chain 51 is moved the carriage will be reciprocated in its track.

I have provided means whereby when the carriages reach the forward end of their movement and assume a position ready to receive the bundles of grain for forming a shock the shaft 19 will be automatically thrown out of gear, so that the carriages will stop when said position is reached, as follows: The reference-numeral 56 indicates a shaft mounted in rotatable bearings extended transversely of the machine-frame immediately in advance of the carriage-tracks. A plate 57 projects downwardly and rearwardly from said shaft, which plate is in position to be engaged by the projections 57ᵃ on the front ends of the carriages whenever they have reached the forward limits of their movement. On one end of the shaft 56 is an arm 58, and fixed to the block 34, as clearly shown in Fig. 4, are two pins 59, having the said arm 58 between them. Obviously when the plate 57 is moved forwardly the said arm 58 is moved downwardly and forwardly to engage the lower one of the pins 59 and to force the block 34 to the lower limit of its movement, thus permitting the shaft 23 to be moved by the spring 32 in such a manner as to bring the cog-wheel 25 out of engagement with the cog-wheel 20 on the shaft 19. Therefore as soon as the carriages reach the forward limit of their movement they are there stopped automatically.

In the practical operation of the machine it is necessary that the carriage-tracks move laterally in the machine-frame to and from each other, and for this purpose I have supported said frames as follows: At the forward end of the machine I have provided two parallel horizontal tracks 60, and fixed to each carriage-track are two arms 61, to project forwardly therefrom, and in the end of each arm I have mounted a grooved wheel 62 to ride upon said track, thereby supporting the front end of the carriage-frame and permitting its movement in the machine-frame. At the rear end of the frame, as clearly shown in Figs. 13 and 14, I have provided parallel tracks 63 above the carriage-frames, and upon each carriage-frame are two arms 64, having grooved wheels 65 thereon to ride upon said tracks. I have provided means also whereby the carriage-frames are normally held by yielding pressure in a direction toward each other, as follows: Mounted upon the machine-frame, above each carriage-frame, is a shaft 66, each shaft having one or more downwardly-projecting arms 67, and the contractile coil-springs 68 are attached to said arms and to a portion of the machine-frame, and the said arms engage the outer surfaces of the carriage-frames. By this means the said springs operating through the arms normally force the carriage-frames together, and, as will hereinafter appear, these carriage-frames are forced apart by means of the bundles of grain in the shock-formers. Hence they will adapt themselves automatically to shocks of various sizes.

The device for receiving the bundles of grain and for standing them in an upright position in the field comprises two holders and formers of identical construction, one attached to each carriage. Hence only one of them will be hereinafter particularly described, it being understood that the other is the same in every respect. Fixed to the shaft 42 of the carriage is a bar 69, and a short cross-bar 70 is fixed to the same shaft, adjacent thereto, to stand at right angles to the bar 69. To each side of the bar 69 I have hinged a rod 71 by means of the hinges 72. To each of these rods I have fixed a series of curved arms 73, and these arms are normally held at their limit of movement in a direction from each other by means of the contractile coil-springs 74, which springs are attached at one end to a short arm 75 on the rod 71 and at their other end to the cross-piece 70, and at the top of one of the rods 71 is an extension 76 for purposes hereinafter made clear, one extension being provided for each shocking member. I have fixed to the cross-piece 70 a roller 77, the function of which will be hereinafter made clear. On the forward one of the shafts 71 I have fixed, at the lower end of said shaft, an arm 78, and at the outer end of said arm is a roller 79, arranged in a horizontal plane. To the other or rear one of the rods 71 I have fixed an arm 80, and in its outer end I have swiveled a caster-wheel 81. To the top of the rear one of the rods 71 I have fixed an arm 82, and in the end of said arm 82 I have rotatably mounted a roller 83 in a horizontal plane. To clearly understand the functions of these various arms and rollers, it is necessary to refer to the construction of the carriage-frame and accompanying parts. In the top of the carriage-frame is a flat piece 84, having the cam-shaped notch 85 therein, which notch is designed to receive the roller 83 on the arm 82, and in practical use the function of this portion of the device is as follows: Assuming that a number of bundles of grain have been placed in the shock-holder and the same has moved, together with the carriage, to the rear end of the machine and is standing in an upright position, it is obvious that so long as the roller 83 engages the edge of the guide-board 84 the arms 73 will be held in a direction toward each other against the pressure of their springs 74 in such a manner as to securely hold the bundles of grain between the arms. Then when the said roller reaches the cam-shaped notch 85 it will obviously enter said notch and permit the arms to open, thereby releasing the grain between the arms and permitting it to stand in an upright position in the field. Beneath the guide 84 is a vertically-arranged guide 86, having its rear end curved outwardly at 87. This portion 87 is preferably arranged below the notch 85 and in such position that when the roller 83 enters the notch 85 the caster 81 will pass beyond the rear end of the guide 86, and obviously so long as the caster engages the guide 86 the arms 73 will be held toward each other. The said caster 81 serves an additional function to that just described, as follows: When the carriage reaches the forward limit of its movement, the rods 71 are turned to a horizontal position, and when in said position it is essential that the lower one of the rods 71 should be held in position with its arms approaching a horizontal position, so as to catch the bundles of grain discharged from the conveyer, and this caster-wheel will by engaging the track 86 at that point firmly hold the lower one of the rods 71 in the desired position, and by reason of its being swiveled, so as to turn in any direction, it will not slide upon the guide 86 at any point throughout its movement.

I shall next describe the means whereby the bar 69 is automatically turned to a horizontal position when it reaches the forward limit of its movement. The inner side of the carriage-frame is provided with a longitudinal horizontal groove, in which the roller 77 operates. The forward end of this groove at 88 is made to follow the upward turn of its guiding-groove, and the parts are so proportioned that when the roller 77 rests in the end of the groove 88 the bar 69 will assume a substantially horizontal position, which position is clearly illustrated in Fig. 6. As to the function of the roller 79 on the arm 78 it is clearly shown in Figs. 7 and 9 that when the rod 71, to which it is attached, is in an upright position the said roller operating upon the guide 86 will hold the arms 73 in about the position shown in Fig. 7 throughout the movement of the carriage. When, however, the rods 71 are turned to a horizontal position, as at the forward end of their movement, this roller 79 passes beyond the front end of the guide 86, as clearly shown in Fig. 6, thus permitting the spring 74 to move said rod 71 in such position that the arms 73 thereon are in a substantially upright position. In the practical operation of this portion of the machine we will assume, first, that the shock holder and former is in the position just described, as shown in Fig. 6, and assuming, further, that the carriage is operated to start toward the rear limit of its movement, the first operation will be that of the roller 77 moving in the cam-groove 88 in such manner as to throw the bar 79 to a substantially vertical position, as shown in Figs. 7, 8, and 9. As soon as this is done the roller 79 engages the track 86 and holds the arms 73 of the rod, to which the roller 79 is attached, in about the position shown in Fig. 7—that is, in position to partially encircle the bundles of grain therein. It is to be remembered in this connection that the caster 81 is always in engagement with the guide 86 when the carriage is at the forward limit of its movement, so that both of the rods 71 are firmly held to the position shown in Fig. 7. Then the carriage continues its rearward movement with the arms 73 in the same position until the roller 83 enters the notch 85. When this is done, the arms 73 of the rear rod 71 move outwardly and permit the shock to pass rearwardly away from the shock-holder.

As clearly illustrated in Fig. 2 of the drawings, I have located at the rear end of the machine-frame near its top a series of guides 89, with their forward edges beveled at 90. These guides are arranged to intersect the path of the extensions or rods 76, and they serve the function of engaging the said rods 76 when they approach the rearward limit of their movement and forcing them outwardly, together with the carriage and carriage-track, to a degree sufficiently to permit the shocks to clear the holding-arms.

Attached to the lower end of the conveyer-frame is a series of arms 91 to project upwardly for the purpose of preventing sheaves of grain discharged from the binder from falling away from the conveyer and for holding said bundles in position until they can be engaged by the teeth on the conveyer and carried forwardly and inwardly thereby. I have also attached to the machine-frame at the rear end of the conveyer-frame a series of arms 92 to project downwardly and inwardly to convey bundles of grain to such position that they will drop into the shock-former, and on a cross-piece 93 of the machine-frame I have fixed another series of arms 94 to also aid in directing the bundles of grain into the shock-holder.

Having thus described in detail the construction and function of each of the various parts of the machine, I will now proceed to a general description of the operation of the machine as a whole without referring specifically to the various parts.

Assuming that the device were connected with a binder and that power were furnished by the binder to operate the shaft 23 and assuming that the device were attached to the binder to be advanced with it or else a separate team were provided for the shocker, it is obvious that as the bundles of grain are discharged from the binder they will fall upon the conveyer. The arms 91 serve to prevent them from falling short of the conveyer. The conveyer operates to carry the said bundles toward the central portion of the machine and over the rear end of the conveyer-frame, where they are conducted by means of the guide-arms 92 and 94 to drop into the shock-former, which is always in position to receive them when the conveyer is operated. As the number of bundles of grain in the shock-former increases they will press the parts of the shock-former outwardly, thus moving the carriage and carriage-tracks outwardly against the pressure-springs 68. When the operator of the binder desires to set the shock upright in the field, he presses upon the treadle 31. This has the effect of throwing the cog-wheels which impart motion to the shocking device in gear, where they are automatically locked by means of the sliding blocks 34. Power is transmitted from the shaft 19 through the sprocket-chains 49 to the sprocket-chains 51, and when the said sprocket-chains 51 are operated the carriages will both be moved to their rearward limit by means of the arms 54 being connected with the said sprocket-chain. These arms 54 are so proportioned that they will travel around the sprockets over which the sprocket-chains 51 pass, and obviously when at the rear limit of their movement the carriages will stop for a short period of time while the arms 54 are passing around the sprocket-wheel 53. This interval of time is sufficiently long to permit the shocks to be placed in an upright position in the field before the shock-holding arms begin their forward movement. The means for opening and closing the shock-forming arms to release the bundle and the means for throwing the shock-forming arms to a horizontal position to receive the bundles have been fully described, and when the carriages reach the forward limit of their movement they will strike the trip device 57, which trip device is operated to force the block 34 downwardly, so that the shaft 19 is thrown out of gear, and obviously the shock-forming arms are then held in the position to receive the shock, as at the beginning of the operation of the machine. The means for imparting motion to the conveyer is automatically started as soon as the shaft 19 is thrown out of gear.

I claim as my invention—

1. In a grain-shocker, the combination with a machine-frame mounted on wheels, a conveyer mechanism on said frame, a shock-holder and means for actuating the shock-holder, of a shaft slidingly and rotatably mounted in the frame and designed to be connected with a binder or the like, a cog-wheel and a bevel gear-wheel fixed to said shaft, a shaft for driving the conveyer, a bevel gear-wheel fixed thereto and designed to mesh with the aforesaid bevel gear-wheel when its shaft is at one limit of its sliding movement, a shaft for actuating the shock-forming mechanism, a cog-wheel fixed to said shaft in position to be engaged by the aforesaid cog-wheel when its shaft is at the opposite limit of its sliding movement, manually-operated means for moving the sliding shaft so that the cog-wheels engage, and a spring-actuated means for returning the sliding shaft to a position where the bevel gear-wheels engage, substantially as, and for the purposes stated.

2. The combination, in a grain-shocker, of a machine-frame, two carriage-frames extended longitudinally of the machine-frame and each capable of independent movement bodily to and from each other, shock-formers connected with said carriage-frames, a yielding pressure device for normally forcing said carriage-frames toward each other, substantially as, and for the purposes stated.

3. In a grain-shocker, the combination with a carriage-frame extended longitudinally of the machine-frame and capable of lateral movement bodily, a rotatable shaft mounted in the machine-frame in advance of the sliding carriage-frame, a sprocket-wheel slidingly mounted but non-rotatably mounted on said shaft, means for connecting the said sprocket-wheel and the said laterally-movable carriage-frame, whereby they are moved in unison, a shaft mounted adjacent to the forward end of the carriage-frame, two sprocket-wheels mounted thereon, a chain for connecting one of said sprocket-wheels with the aforesaid sliding sprocket-wheel, a second shaft at the rear end of the carriage-frame, a sprocket-wheel thereon, a chain connecting said sprocket-wheel with the remaining sprocket-wheel on the aforesaid shaft, a carriage mounted for longitudinal movement within said carriage-frame, and means for connecting the carriage with the said latter-mentioned chain, substantially as and for the purposes stated.

4. In a grain-shocker, the combination of a machine-frame, a shaft to be driven from a binder and slidingly mounted in the machine-frame, a cog-wheel on said shaft and a bevel gear-wheel on said shaft, a conveyer mounted upon the machine-frame, and means for driving said conveyer from said bevel gear-wheel when the said sliding shaft is at one limit of its movement, a shaft mounted in suitable bearings parallel with the said sliding shaft, a cog-wheel thereon, designed to mesh with the aforesaid cog-wheel when the said sliding shaft is at the opposite limit of its movement, a yielding pressure device for normally holding the sliding shaft so that the cog-wheels are out of engagement and the bevel gear-wheel is in a position to drive the conveyer, a spring-actuated sliding block to normally lock the sliding shaft in position with the cog-wheels in engagement, a shaft extended transversely of the machine-frame and having a plate thereon projecting downwardly, an arm on the end of said shaft and two pins or stops fixed to said sliding block to be engaged by said arm, a carriage-frame mounted on the machine-frame, a carriage slidingly mounted in said frame to be capable of longitudinal movement, and a shock-forming member connected with said carriage, said carriage being shaped to engage the said plate when at the forward limit of its movement and thereby withdraw the sliding block so as to throw the cog-wheels out of engagement and stop the movements of the carriage, substantially as, and for the purposes stated.

5. In a grain-shocker, the combination of two carriage-frames capable of movement bodily in a lateral direction to and from each other, two tracks extended transversely of the machine-frame at the front of the machine, and two at the back, two arms fixed to each end of each carriage-frame and grooved wheels on said arms mounted upon said tracks, whereby said carriage-frames are rigidly supported and at the same time capable of free movement laterally, and a yielding pressure device for normally forcing said carriage-frames toward each other.

6. In a grain-shocker, a shock-forming member, comprising in combination a carriage-frame, a guide 84 at the top of the frame having a notch 85 therein, a guide 86 at the bottom of the frame, having a curved end 87, and a cam-shaped guide 88 at one side of the frame, a carriage mounted in the frame for longitudinal movement, a shaft projected through said carriage, a bar fixed to one end of said shaft, two parallel rods hinged to said bar, curved arms fixed to each rod, a cross-bar fixed to said shaft, a roller 77 fixed to said cross-bar to enter the cam-shaped track 88, yielding pressure devices fixed to said rods to normally hold the curved arms in their normally-extended position, the arm 78 fixed to one of said rods and having the roller 79 thereon to engage the track 86, the arm 80 fixed to the lower end of the other rod, a caster 81 connected with said arm 80, the arm 82 fixed to the top of the latter-mentioned rod, and a roller 83 connected with said arm to operate in the guide 84 and notch 85 thereof, arranged and combined for operation, substantially in the manner set forth, for the purposes stated.

7. In a grain-shocker, the combination of a carriage, a shaft extended transversely through the carriage, a bar fixed to one end of said shaft, two rods hinged to the sides of said bar in parallel planes, a series of curved, stalk-engaging arms fixed to each of said rods, yielding pressure devices for normally holding the rods in position, with their curved arms at their outer limit of movement, a guide adjacent to the carriage, and an arm having a roller in its end, fixed to each of said rods, said rollers being designed to engage the said guide, whereby the movements of the curved arms for engaging the stalks are controlled, substantially as, and for the purposes stated.

8. In a grain-shocker, the combination of a carriage-frame capable of bodily movement in a lateral direction, a carriage mounted therein, capable of longitudinal movement, a shaft rotatably mounted in the carriage, a shocker member connected with said shaft, and capable of movement from a vertical to a horizontal position, said shocking member being composed of two parts, each part having a series of curved arms capable of movement to and from each other, yielding pressure devices for normally holding said curved arms at their limit of movement from each other, means for automatically turning the said shocking member to a substantially horizontal position when at the forward limit of the movement, automatic means for forcing the lower set of curved arms of said shocker member when in a horizontal position to the limit of its movement toward the upper set of curved arms, means for holding both of said sets of curved arms to the limit of their movement toward each other when the shocker member is passing rearwardly, and means for releasing the rear set of curved arms when the shocker member is in an upright position and at the rear end of its movement, so that the said arms may swing to their limit of movement from the forward set, substantially as, and for the purposes stated.

9. In a grain-shocker, the combination of a carriage-frame capable of bodily movement in a lateral direction, a carriage mounted therein, capable of longitudinal movement, a shaft rotatably mounted in the carriage, a shocker member connected with said shaft, and capable of movement from a vertical to a horizontal position, said shocker member being composed of two parts, each having a series of curved arms capable of movement to and from each other, yielding pressure devices for normally holding said curved arms at their limit of movement from each other, means for automatically turning the said shocker member to a substantially horizontal position when at the forward limit of its movement, automatic means for forcing the lower set of curved arms of said shocker member when in its horizontal position to the limit of its movement toward the upper set of curved arms, means for holding both of said sets of curved arms to the limit of their movement toward each other when the shocker member is passing rearwardly, and means for releasing the rear set of curved arms when the shocker member is in an upright position and at the rear end of its movement, so that the said arms may swing to their limit of movement from the forward set, and an extension 76, at the upper end of the shocker member, guides 89 fixed to the machine-frame to be engaged by said extension, substantially as, and for the purposes stated.

10. In a grain-shocker, the combination of a machine-frame mounted on wheels, a conveyer on the machine-frame to receive bundles of grain from a binder and convey them toward the central portion of the machine-frame, two shocker members in position to receive bundles of grain from the conveyer, each shocker member comprising two sets of curved arms, independently movable in a direction to and from each other, said shocker members being normally arranged in a horizontal position with the lower sets of curved arms at their inner limit of movement and their upper sets of curved arms at their outer limit of movement, means for slidingly supporting the shocker members, whereby they may move to and from each other, yielding pressure devices for normally holding them to their limit of movement toward each other, mechanism for simultaneously moving the shocker members to a vertical position, and means for moving the rear set of arms of the shocker members to their outer limit of movement, to discharge a shock, for the purposes stated.

11. An improved grain-shocker, comprising a frame mounted on wheels, a shaft in said frame, a conveyer operated from said shaft and arranged to receive bundles of grain and carry them toward the central portion of the machine-frame, two carriage-frames mounted longitudinally of the machine-frame and capable of movement laterally to and from each other, yielding pressure devices for normally holding said carriage-frames to their limit of movement toward each other, a carriage in each frame, a shocker member borne by each carriage, each of said shocker members comprising two sets of curved arms independently movable to and from each other, yielding pressure devices for normally holding the curved arms of each shocker member to their limit of movement from each other, mechanism actuated from said shaft whereby said carriages are moved rearwardly at the same time, means whereby the shocker members are made to assume a horizontal position when at the forward limit of their movement and a vertical position when at the rearward limit of their movement in said carriage-frames, means whereby the lower sets of curved arms are held to their upper limit of movement when in said horizontal position, and means whereby the other sets of curved arms are held inwardly when in a vertical position and traveling rearwardly, until such time as they reach the rearward limit of their movement, manually-operated means for gearing the carriages to said shaft whereby they are moved rearwardly and then returned, and an automatic means whereby the conveyer will be operated from said shaft when the carriages reach the forward limit of their movement, and at the same time the movement of the carriages will be stopped, for the purposes stated.

JOHN McCORMICK.

Witnesses:
W. H. HARLOW,
E. M. HARLOW.